(12) United States Patent
Choi

(10) Patent No.: US 12,157,082 B2
(45) Date of Patent: Dec. 3, 2024

(54) REMOVABLE FILTER SYSTEM

(71) Applicant: Jin Min Choi, Seoul (KR)

(72) Inventor: Jin Min Choi, Seoul (KR)

( * ) Notice: Subject to any disclaimer, the term of this patent is extended or adjusted under 35 U.S.C. 154(b) by 172 days.

(21) Appl. No.: 17/768,054

(22) PCT Filed: Feb. 3, 2021

(86) PCT No.: PCT/KR2021/001396
§ 371 (c)(1),
(2) Date: Apr. 11, 2022

(87) PCT Pub. No.: WO2022/163891
PCT Pub. Date: Aug. 4, 2022

(65) Prior Publication Data
US 2023/0158437 A1 May 25, 2023

(30) Foreign Application Priority Data
Feb. 1, 2021 (KR) .................. 10-2021-0014302

(51) Int. Cl.
*B01D 46/42* (2006.01)
*B01D 46/00* (2022.01)
(Continued)

(52) U.S. Cl.
CPC ..... *B01D 46/4227* (2013.01); *B01D 46/0006* (2013.01); *B01D 46/0012* (2013.01); *B01D 46/10* (2013.01); *F23D 14/68* (2013.01)

(58) Field of Classification Search
CPC ............ B01D 46/4227; B01D 46/0006; B01D 46/0012; B01D 46/10; F23D 14/68
(Continued)

(56) References Cited

U.S. PATENT DOCUMENTS 6,149,698 A * 11/2000 Uehara ............... F24F 7/08
454/351
2013/0239432 A1* 9/2013 David ............... F26B 21/04
34/218
(Continued)

FOREIGN PATENT DOCUMENTS

JP H03-89996 U 9/1991
JP 2531269 Y2 4/1997
(Continued)

OTHER PUBLICATIONS

An Office Action; "Notice of Reasons for Refusal," mailed by the Japanese Patent Office on Jul. 18, 2023, which corresponds to Japanese Patent Application No. 2022-528327 and is related to U.S. Appl. No. 17/768,054; with English language translation.
(Continued)

*Primary Examiner* — Robert A Hopkins
*Assistant Examiner* — Qianping He
(74) *Attorney, Agent, or Firm* — Studebaker & Brackett PC

(57) ABSTRACT

The present disclosure relates to a removable filter system for removably coupling a filter unit to an air supply unit provided in a boiler. The filter unit is detachably coupled to the air supply unit, so that after removing the contaminated filter unit coupled to the air supply unit, a new filter unit can be coupled to the air supply unit or the existing filter unit can be reused after removing contaminants remaining in the filter.

1 Claim, 6 Drawing Sheets

(51) Int. Cl.
*B01D 46/10* (2006.01)
*F23D 14/68* (2006.01)

(58) Field of Classification Search
USPC .................................................. 55/357, 481
See application file for complete search history.

(56) References Cited

U.S. PATENT DOCUMENTS

2018/0245816 A1    8/2018  Nagasaka et al.
2021/0095889 A1*   4/2021  Park ....................... B01D 46/10

FOREIGN PATENT DOCUMENTS

| JP | 2001-063357 | A |   | 3/2001  |
|----|-------------|---|---|---------|
| JP | 2018-141577 | A |   | 9/2018  |
| KR | 10-1902455  | B1|   | 9/2018  |
| KR | 10-2019-0142280 | A | | 12/2019 |
| KR | 10-2020-0042207 | A | | 4/2020  |
| KR | 20200042207 | A | * | 4/2020  |

OTHER PUBLICATIONS

An Office Action issued by the German Patent and Trademark Office on Sep. 6, 2024, which corresponds to German Patent Application No. 11 2021 000 363.1 and is related to U.S. Appl. No. 17/768,054.
Examination Report mailed by The Intellectual Property Office of the United Kingdom on Oct. 1, 2024, which corresponds to U.K. Patent Application No. GB2206922.3, and is related to U.S. Appl. No. 17/768,054.

* cited by examiner

REMOVABLE FILTER SYSTEM

CROSS-REFERENCE TO RELATED APPLICATIONS

This application is the U.S. National Stage of International Application No. PCT/KR2021/001396 filed Feb. 3, 2021, which claims benefit of priority to Korean Patent Application No. 10-2021-0014302 filed Feb. 1, 2021, the entire content of which is incorporated herein by reference.

BACKGROUND OF THE DISCLOSURE

Field of the Disclosure

The present disclosure relates to a removable filter system, and more particularly, to a removable filter system for detachably coupling a filter unit to an air supply unit provided in a boiler.

Related Art

In general, a gas boiler uses a gas as fuel and water as a heating medium for heating, and in the case of a hot water and heating boiler, it is a combustor that circulates heating water inside the boiler through a three-way valve and heats feed water in a form of indirect heat exchange to make hot water available. The gas boiler is installed in various buildings such as a house, an office, a factory and the like, and is configured to supply hot water or heating water. The gas boiler may be classified into a general boiler and a condensing boiler depending on whether condensate is generated, and classified into an instantaneous type boiler and a hot water storage type boiler depending on a hot water supply method.

Referring to a basic structure of such a gas boiler, a combustion device and a heat exchanger are provided inside a housing. In the combustion device, a flame by fuel, i.e., gas, is combusted in a form of a free flame having an appropriate length. Then, the combustion gas from combustion device is discharged through a pipe after exchanging heat with a heating medium in the heat exchanger.

Meanwhile, in order to keep the combustion efficiency of the combustion device constant, the ratio of air and fuel flow rate needs to be kept constant. To this end, air needs to be constantly supplied from the outside to an air inlet of the housing, and the air needs to be free of various contaminants such as fine dust. That is, when various contaminants contained in the air supplied to the air inlet are supplied to the combustion device as they are, the ratio of air and fuel flow rate varies arbitrarily. As a result, the mixing ratio of gas and air is not properly controlled or combustion does not proceed properly, which decreases heat exchange efficiency.

To solve the above problem, referring to Korean Patent No. 10-1902455, a filter unit is installed around an air inlet of a boiler casing so that the outside air is filtered and then introduced into the casing, and then introduced into the casing. Accordingly, the filter installed at the air inlet of the boiler filters foreign materials contained in the air flowing into the casing through the air inlet and quantitatively supplies the air required for combustion of the boiler.

However, in the conventional filter for the air inlet of the boiler, when the filter unit filters out foreign materials above an allowable amount, the filter unit is completely clogged over time, so that essential amount of air necessary for combustion cannot not be provided to the combustion device, which causes incomplete combustion or a flashback phenomenon in the combustion device.

SUMMARY

In view of the above, the present disclosure provides a removable filter system that allows a filter unit to be easily replaced by detachably coupling the filter unit to an air supply unit provided in a boiler.

In an aspect, the present disclosure provides a removable filter system including: a penetrating part formed through one side of an air supply unit provided in a boiler; and a filter unit including a support portion formed to cover an inside of the air supply unit and having a guide hole formed in a central portion, a handle portion integrally connected to one side of the support portion and formed to cover the penetrating part, and a filter for covering the guide hole, wherein the filter unit is detachably coupled to the air supply unit.

In addition, a guide protrusion may be formed on an outer surface of the handle portion to be gripped by a user.

Further, the filter may be formed concave downward.

Furthermore, the filter may include a flat portion positioned to be spaced apart from the guide hole downward and formed to be flat, and a connecting portion formed to extend from an outer periphery of the flat portion to an inner periphery of the guide hole to connect the outer periphery of the flat portion and the inner periphery of the guide hole, and an accommodation space may be provided between the flat portion and the connecting portion.

In addition, the filter may be formed in a mesh shape.

Further, the removable filter system may further include a protrusion part formed to protrude outward from an edge of the penetrating portion, the protrusion part having an empty space formed therein, wherein one side of the protrusion part is formed integrally with the penetrating portion to communicate with the penetrating portion, and an insertion hole is formed at the other side of the protrusion part, the support portion is guided into the protrusion part through the insertion hole, and then the support portion passes through the penetrating portion to be inserted into the air supply unit, and when the support portion is inserted into the air supply unit, the handle portion is detachably coupled to the insertion hole.

Further, a first bolt coupling portion may be formed on each of both sides of the insertion hole, a second bolt coupling portion may be formed to cover the first bolt coupling portion on each of both sides of the handle portion, and a bolt may be detachably coupled to the second bolt coupling portion and the first bolt coupling portion.

Further, the protrusion part may be formed at one side of an outer periphery of the air supply unit, a guide groove may be formed on one side of an inner periphery of the air supply unit opposite to the protrusion part, and when the support portion is inserted into the air supply unit, the support portion may move to one side of the air supply unit while being guided along the protrusion part, and then move to the other side of the air supply unit while being guided along the guide groove, and both end portions of the guide groove may be formed to extend toward of the protrusion part.

According to the present disclosure, since the filter unit is detachably coupled to the air supply unit, after removing the contaminated filter unit coupled to the air supply unit, a new filter unit is coupled to the air supply unit or the existing filter unit is reused after removing contaminants remaining in the filter.

DESCRIPTION OF REFERENCE NUMERALS

Figure 1:
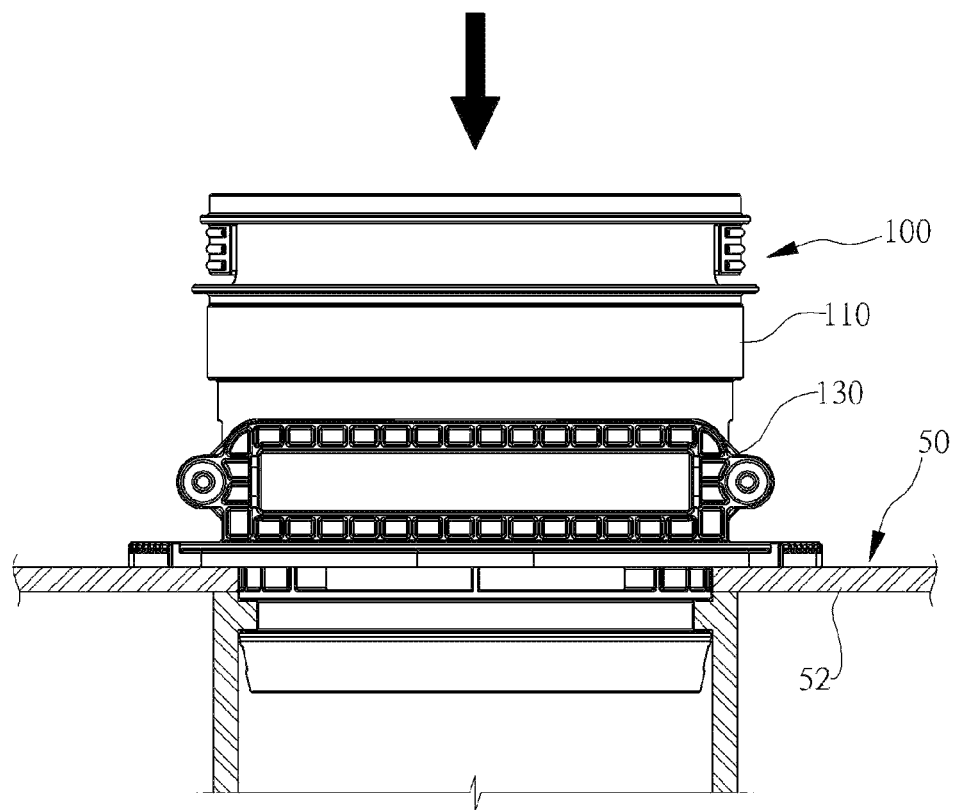
FIG. 1 is a view showing a state in which a removable filter system according to one embodiment of the present disclosure is mounted on a boiler.

100: removable filter system
110: air supply unit
110a: penetrating portion
112: guide groove
120: protrusion part
120a: insertion hole
122: first bolt coupling portion
130: filter unit
132: support part
132a: guide hole
134: handle portion
134a: guide protrusion
134b: second bolt coupling part
136: filter
136a: flat portion
136b: connecting portion
136c: accommodation space
140: packing part

DESCRIPTION OF EXEMPLARY EMBODIMENTS

Hereinafter, a removable filter system according to one embodiment of the present disclosure will be described in more detail with reference to the accompanying drawings.

Figure 2:
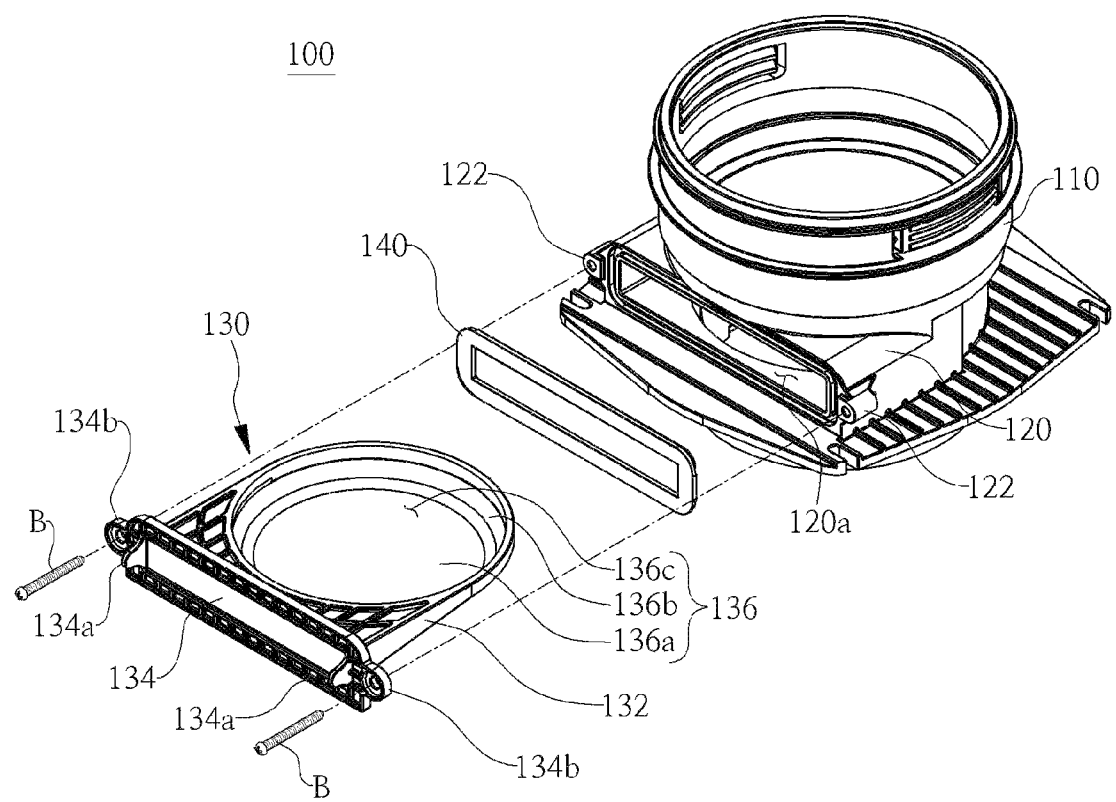
FIG. 2 is a view schematically showing a state in which the removable filter system according to one embodiment of the present disclosure is separated.
Figure 3:
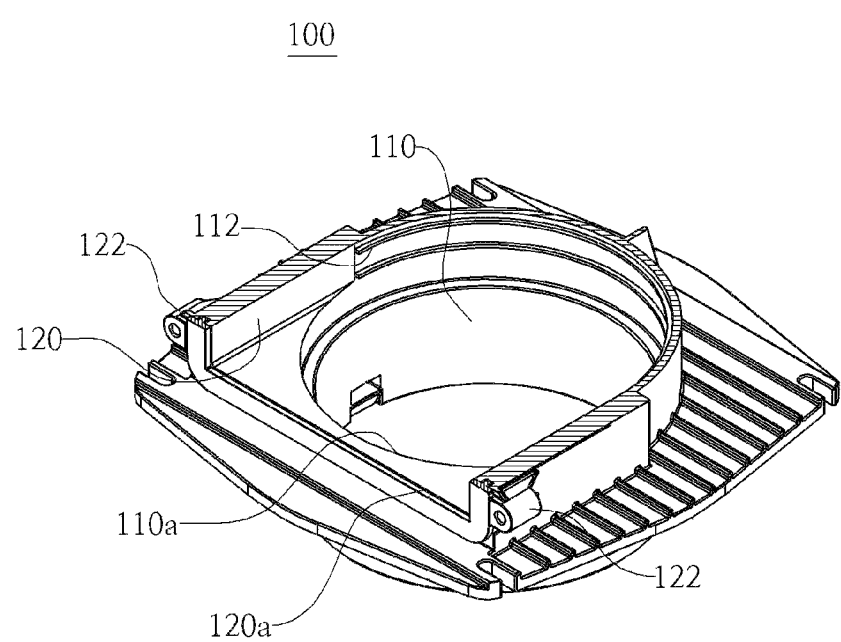
FIG. 3 is a cross-sectional view showing an air supply unit of the removable filter system according to one embodiment of the present disclosure.

FIG. 1 is a view showing a state in which a removable filter system according to one embodiment of the present disclosure is mounted on a boiler, and FIG. 2 is a view schematically showing a state in which the removable filter system according to one embodiment of the present disclosure is separated. FIG. 3 is a cross-sectional view showing an air supply unit of the removable filter system according to one embodiment of the present disclosure.

Referring to FIGS. 1 to 3, the removable filter system 100 according to one embodiment of the present disclosure includes a penetrating portion 110a, a protrusion part 120, a filter unit 130, and a packing part 140, wherein the filter unit 130 is detachably coupled to the air supply unit 110 provided in a boiler 50, so that the filter unit 130 can be easily replaced.

The boiler 50 has a typical configuration in which various parts such as a combustion device (not shown) and a heat exchanger (not shown) are provided inside a housing 52 formed in a substantially hexahedral shape.

The air supply unit 110 and an exhaust unit (not shown) are provided above the housing 52 so that air is supplied into a casing through the air supply unit 110 and the air inside the casing is exhausted to the outside through the exhaust unit.

The air supply unit 110 is formed in a cylindrical shape, for example, and the penetrating portion 110a is formed through along one side of an outer periphery of the air supply unit 110.

The protrusion part 120 is formed to protrude from one side of the outer periphery of the air supply unit 110. Specifically, the protrusion part 120 is integrally formed to protrude outward from an edge of the penetrating portion 110a.

An empty space is formed inside the protrusion part 120, one side of the protrusion part 120 is formed integrally with the penetrating portion 110a to communicate with the penetrating portion 110a, and the other side of the protrusion part 120 has an insertion hole 120a that is formed therethough.

Further, a guide groove 112 may be formed on one side of an inner periphery of the air supply unit 110 opposite to the protrusion part 120. The guide groove 112 is formed along one side of the inner periphery of the air supply unit 110. Both end portions of the guide groove 112 in the longitudinal direction are formed to extend toward the protrusion part 120, and both ends of the guide groove 112 are positioned to face the protrusion part 120.

The filter unit 130 is detachably coupled to the air supply unit 110, and includes a support portion 132, a handle portion 134, and a filter 136. One side of the support portion 132 is formed in a circular shape to cover the inside of the air supply unit 110, and the other side is formed to be seated inside the protrusion part 120. Further, a guide hole 132a is formed in a central portion of one side of the support part 132. The handle portion 134 is integrally connected to an outer side of the support portion 132 and is formed in a plate shape to cover the guide hole 132a. When the handle portion 134 is positioned to cover the guide hole 132a, the handle portion 134 can also cover the penetrating portion 110a positioned to face the guide hole 132a. In addition, a pair of guide protrusions 134a are protruded from both sides of an outer surface of the handle portion 134 positioned opposite to the support portion 132. The guide protrusions 134a are formed to protrude outward of the guide hole 132a, so that a user can easily grip the guide protrusions 134a by hand.

The filter 136 may be formed in a mesh shape which allows air to pass therethrough and blocks foreign substances, for example. The filter 136 is configured to be concave downward, and specifically may include a flat portion 136a that is positioned to be spaced apart from a lower side of the guide hole 132a and is formed flat, and a connecting portion 136b formed to extend from an outer periphery of the flat portion 136a to an inner periphery of the guide hole 132a to connect the outer periphery of the flat portion 136a and the inner periphery of the guide hole 132a. Further, an accommodation space 136c is provided between the flat portion 136a and the connecting portion 136b.

The packing part 140 has a common configuration that it is positioned between the handle portion 134 and the insertion hole 120a, and makes the handle portion 134 and the insertion hole 120a watertight when the handle portion 134 is positioned to cover the insertion hole 120a.

Figure 4:
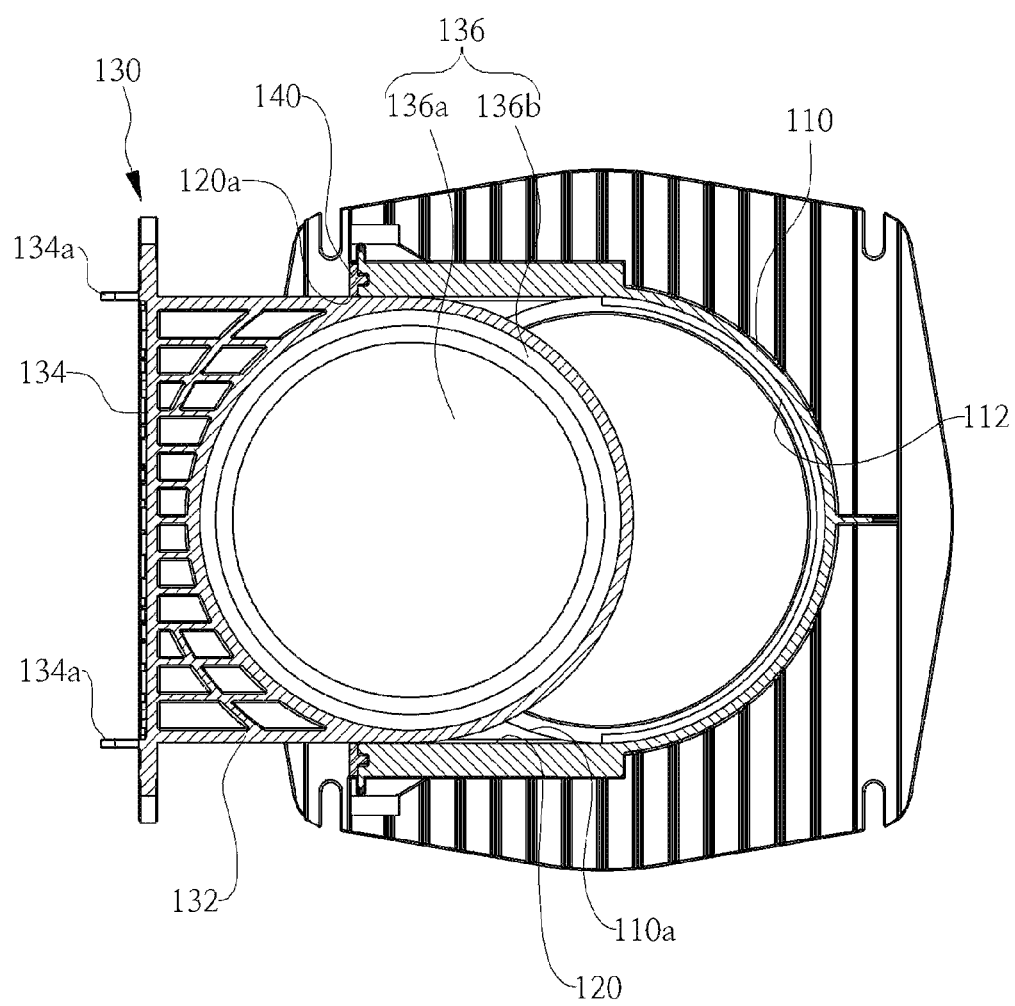
FIG. 4 is a cross-sectional view illustrating a state in which the filter of the removable filter system according to one embodiment of the present disclosure is inserted into the air supply unit along the protrusion part.
Figure 5:
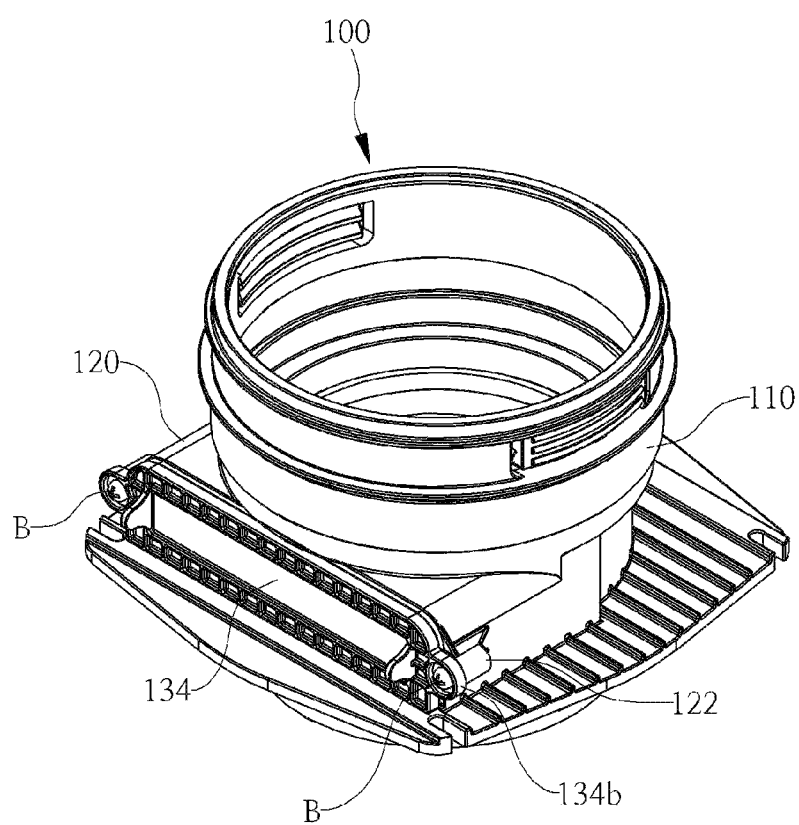
FIG. 5 is a view schematically showing a state in which the filter of the removable filter system according to one embodiment of the present disclosure is coupled to the air supply unit.
Figure 6:
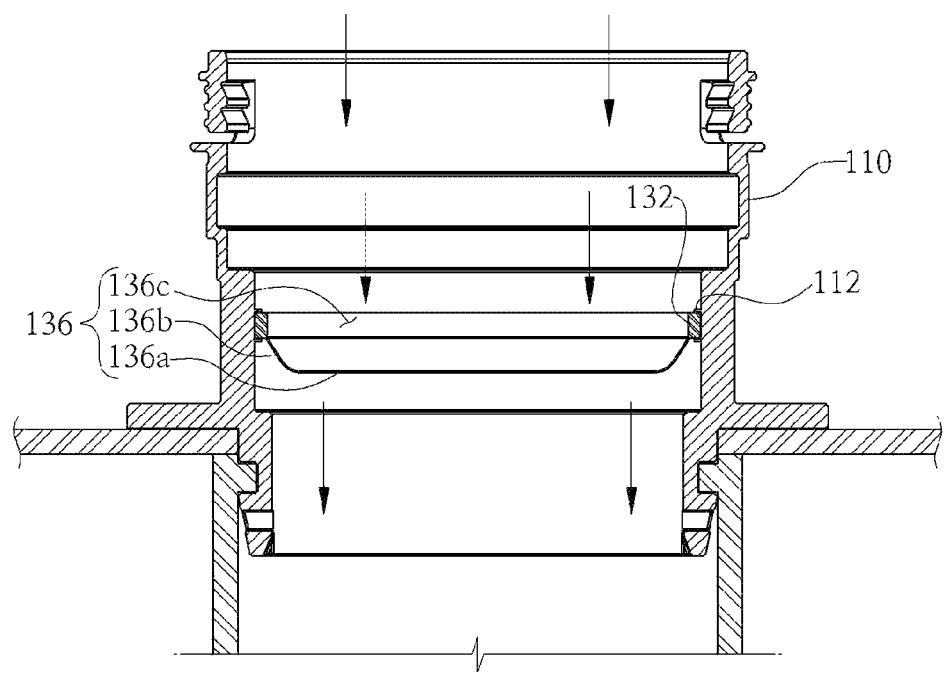
FIG. 6 is a cross-sectional view showing a state in which the filter of the removable filter system according to one embodiment of the present invention is coupled to the air supply unit.

FIG. 4 is a cross-sectional view illustrating a state in which the filter of the removable filter system according to one embodiment of the present disclosure is inserted into the air supply unit along the protrusion part, and FIG. 5 is a view schematically showing a state in which the filter of the removable filter system according to one embodiment of the present disclosure is coupled to the air supply unit, and FIG. 6 is a cross-sectional view showing a state in which the filter of the removable filter system according to one embodiment of the present invention is coupled to the air supply unit.

Referring to FIGS. 4 to 6, in the process in which the filter unit 130 is coupled to the air supply unit 110, first, the support unit 132 is inserted into the protrusion part 120 through the insertion hole 120a. At this time, since the support portion 132 is guided along an inner bottom surface of the protrusion part 120, the support portion 132 can slide safely toward the air supply unit 110 along the inner bottom surface of the protrusion part 120 without shaking inside the protrusion part 120. Then, the support portion 132 is inserted into the air supply unit 110 through the penetrating portion 110a. In this case, the outer periphery of the support portion 132 can safely slide toward the air supply unit 110 along the guide groove 112 in a state that it is inserted into the guide groove 112. As such, when the support portion 132 of the filter unit 130 is inserted into the air supply unit 110, the support portion 132 can be safely inserted into the air supply unit 110 while being guided by the protrusion part 120 and the guide groove 112.

Further, in a state in which the support portion 132 is inserted into the air supply unit 110, the filter unit 136 positioned on the support portion 132 filters various contaminants in the air supplied through the air supply unit 110. And, in the process of filtering the contaminants in the air, various contaminants accumulate in a receiving space 136c of the filter 136. Since the filter 136 provides a space for contaminants to accumulate, when the filter unit 130 is removed from the air supply unit 110, the contaminants filtered by the filter 136 do not remain in the air supply unit 110 and can be easily moved to the outside.

In addition, when the support portion 132 is inserted into the air supply unit 110, the handle portion 134 is positioned to cover the insertion hole 120a. At this time, a first bolt coupling portion 122 is formed on each of both sides of the insertion hole 120a, and a second bolt coupling portion 134b is formed to cover the first bolt coupling portion 122 on each of both sides of the handle portion 134. And, a bolt B is detachably coupled to the second bolt coupling portion 134b and the first bolt coupling portion 122. In this way, since the insertion part is detachably located in the insertion hole 120a, when a lot of contaminants are accumulated in the filter 136, after releasing the coupling of the bolt B, the handle portion 134 is removed to the outside. Then, the support portion 132 is removed from the air supply unit 110, and the entire filter unit 130 is removed from the air supply unit 110. Thereafter, a new filter unit 130 may be coupled to the air supply unit 110, or the existing filter unit 130 may be reused after removing contaminants remaining in the filter 136.

Although the present disclosure has been described in detail in the above embodiments, it goes without saying that the present disclosure is not limited thereto, and it is apparent to those skilled in the art that various changes and modifications may be made within the scope of the technical spirit of the present disclosure, and these variations and modifications fall within the scope of the appended claims, the technical idea should also be regarded as belonging to the present disclosure.

What is claimed is:

1. A removable filter system, comprising:
an air supply unit configured to be provided in a boiler, and comprising a penetrating portion having an empty space;
a protrusion part formed to protrude outward from an edge of the penetrating portion;
a filter unit including a support portion configured to cover an inside of the air supply unit and having a guide hole formed in a central portion, a handle portion integrally connected to one side of the support portion, and a filter formed to cover the guide hole, wherein the filter unit is configured to be detachably coupled to the air supply unit; and
wherein a first side of the protrusion part is integrally connected with the penetrating portion, and an insertion hole is formed at a second side of the protrusion part,
wherein the support portion is configured to be guided into the protrusion part through the insertion hole, and then to pass through the penetrating portion, to be inserted into the air supply unit,
wherein when the support portion is inserted into the air supply unit, the handle portion is detachably coupled to the insertion hole,
wherein the protrusion part is formed at one side of an outer periphery of the air supply unit,
wherein a guide groove is formed on one side of an inner periphery of the air supply unit opposite to the protrusion part, and
wherein when the support portion is being inserted into the air supply unit, the support portion is configured to move by being guided along the protrusion part, and then to move by being guided along the guide groove.

* * * * *